Oct. 3, 1961 A. R. VAN CORTLANDT WARRINGTON 3,003,082
ELECTRICAL PROTECTIVE RELAY SYSTEMS
Filed Oct. 4, 1957
2 Sheets-Sheet 1

Inventor:
Albert Russell van Cortlandt Warrington
By:
Strauss, Davis, Muller & Mosher
Attorneys Oct. 3, 1961   A. R. VAN CORTLANDT WARRINGTON   3,003,082
ELECTRICAL PROTECTIVE RELAY SYSTEMS
Filed Oct. 4, 1957
2 Sheets-Sheet 2

United States Patent Office 3,003,082
Patented Oct. 3, 1961

3,003,082
ELECTRICAL PROTECTIVE RELAY SYSTEMS
Albert Russell van Cortlandt Warrington, Stafford, England, assignor to The English Electric Company Limited, London, England, a British company
Filed Oct. 4, 1957, Ser. No. 688,244
9 Claims. (Cl. 317—32)

This invention relates to electrical protective relay systems utilizing relays in which an electroconductive armature is influenced by an operating flux, a restraining flux and a polarizing flux.

It is an object of this invention to provide an improved relay of this kind which is particularly adapted for use in a multi relay system in which some relays provide back-up protection to other relays. A relay according to this invention may be incorporated with advantage in an electrical protective relay system together with at least one other relay which affords back-up protection to the first relay, and the restraining windings of the relays may be energized directly from common terminals on a voltage transformer energized from a line protected by the relays.

According to one aspect of the invention an electrical protective relay system comprises a protected power circuit, a current transformer having a primary winding connected to be energized by said circuit, a voltage transformer having a primary winding connected to be energized by said circuit, and a relay comprising an electroconductive armature, a magnetic core system adapted to apply a torque to said armature when windings on said core are energized, an operating winding and a restraining winding and a polarizing winding mounted on independent flux paths in said core system and operative to apply by electromagnetic induction a torque to the armature proportional to the product of the energization of the polarizing winding and the differential energization of the operating winding and the restraining winding, an impedance element, a pair of current terminals connected to the secondary winding of the current transformer and a pair of voltage terminals connected to the secondary winding of the voltage transformer, and connections between said terminals, said impedance element, and said windings for (a) energizing said operating winding in proportion to a current supplied to the current terminals, (b) energizing said restraining winding in proportion to a voltage applied to the voltage terminals, and (c) energizing said polarizing winding in accordance with the combined influence of said current and said voltage, said impedance element being operative to effect the current and voltage combination necessary to energize the polarizing winding.

According to a feature of the invention said magnetic core system has a symmetrical four pole construction and said operating winding is mounted on one pole, said restraining winding is mounted on the other pole, and the polarizing winding is in two sections one on each of the remaining poles, the operating winding being connected across said current terminals through said impedance element, the restraining winding being connected directly to said voltage terminals, the polarizing winding being connected between one voltage terminal and the junction between the operating winding and the impedance element, and there being a common connection between the other voltage terminal and the connection of the impedance element to a current terminal.

According to another feature of the invention said relay further comprises a variable impedance element connected in the circuit of the polarizing winding for adjusting the relay characteristic.

According to another aspect of the invention an electrical protective relay system comprises a protected circuit, a current transformer having a primary winding connected to be energized by said circuit, a voltage transformer having a primary winding connected to be energized by said circuit, and a relay comprising an electroconductive armature, a magnetic core system adapted to apply a torque to said armature when windings on said core are energized, an operating winding and a restraining winding and a polarizing winding mounted on independent flux paths in said core system and operative to apply by electromagnetic induction a torque to the armature proportional to the product of the energization of the polarizing winding and the differential energization of the operating winding and the restraining winding, a magnetic coupling device, a pair of current terminals connected to the secondary winding of the current transformer and a pair of voltage terminals connected to the secondary winding of the voltage transformer, and connections between said terminals, said magnetic coupling device, and said windings for (a) energizing said operating winding in proportion to a current supplied to the current terminals, (b) energizing said restraining winding in proportion to a voltage applied to the voltage terminals, and (c) energizing said polarizing winding in accordance with the combined influence of said current and said voltage, said magnetic coupling device being operative to effect the current and voltage combination necessary to energize the polarizing winding.

According to a further feature of the invention said magnetic core system has a symmetrical four pole construction and said operating winding is mounted on one pole, said restraining winding is mounted on the opposite pole, and the polarizing winding is in two sections one on each of the remaining poles, the operating winding being connected across said current terminals through the primary winding of said magnetic coupling device, the restraining winding being connected directly to said voltage terminals and the secondary winding of the said magnetic coupling device being connected with the two sections of the polarizing winding in series between the voltage terminals.

According to yet another aspect of the invention an electrical protective relay system comprises a protected circuit, a current transformer having a primary winding connected to be energized by said circuit, a voltage transformer having a primary winding connected to be energized by said circuit, and a relay comprising an electroconductive armature, a magnetic core system adapted to apply a torque to said armature when windings on said core are energized, an operating winding and a restraining winding and a polarizing winding mounted on independent flux paths in said core system and operative to apply by electromagnetic induction a torque to the armature proportional to the product of the energization of the polarizing winding and the differential energization of the operating winding and the restraining winding, an auxiliary winding mounted on said core system and inductively coupled by the core system with the operating winding, a pair of current terminals connected to the secondary winding of the current transformer and a pair of voltage terminals connected to the secondary winding of the voltage transformer, and connections between said terminals and said windings for (a) energizing said operating winding in proportion to a current supplied to the current terminals, (b) energizing said restraining winding in proportion to a voltage applied to the voltage terminals, and (c) energizing said polarizing winding in accordance with the combined influence of said current and said voltage, said auxiliary winding being operative to effect the current and voltage combination necessary to energize the polarizing winding.

According to yet another feature of the invention said magnetic core system has a symmetrical four pole construction and said operating winding is mounted on one pole, said restraining winding is mounted on the opposite pole, the polarizing winding is in two sections which are mounted one on each of the remaining poles, and the auxiliary winding is mounted on the same pole as the operating winding, the operating winding being connected directly to said current terminals, the restraining winding being connected directly to said voltage terminals, and the auxiliary winding being connected with the two sections of the polarizing winding in series between the voltage terminals.

In order that the invention may be well understood and readily carried into effect it will now be described with reference to FIGS. 1 to 7 of the accompanying drawings. In these drawings.

Figure 3:
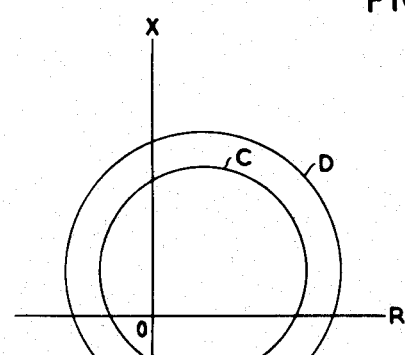
Figure 5:
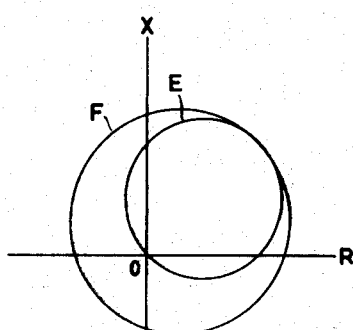
Figure 2:
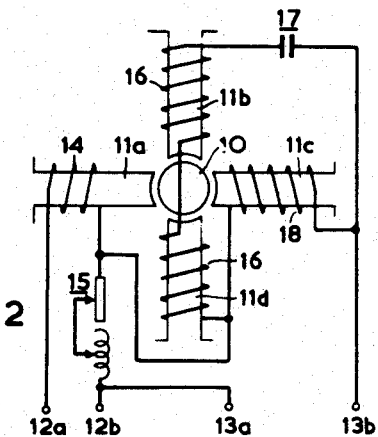
FIG. 2 illustrates in schematic form a known relay circuit.
Figure 4:
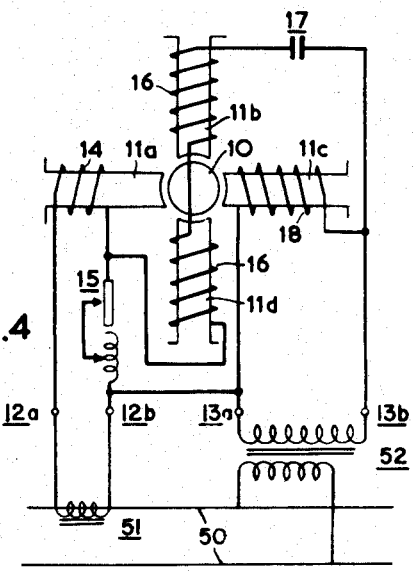
Figure 6:
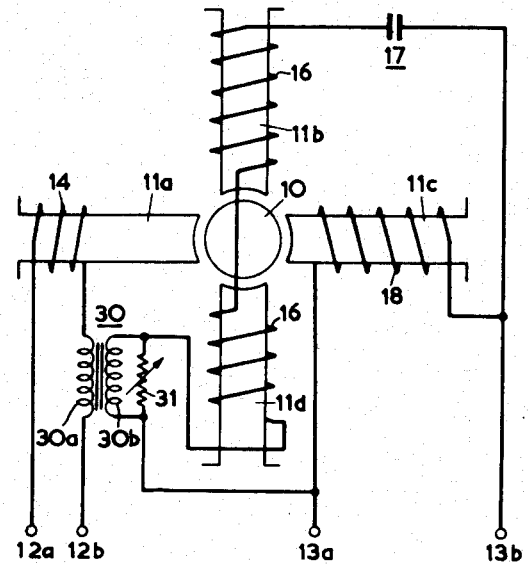
Figure 7:
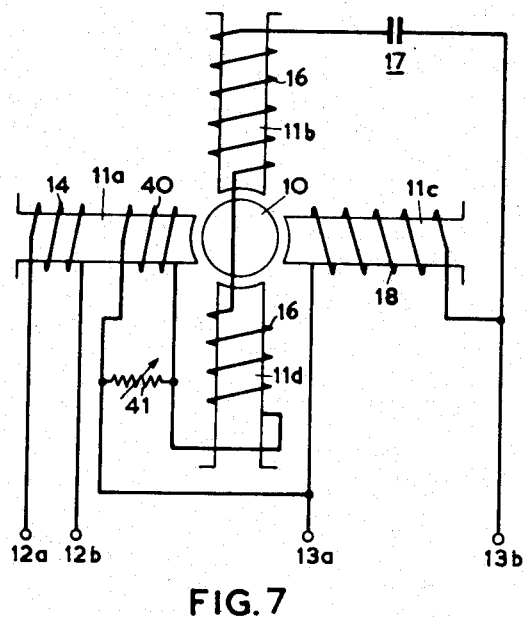

FIG. 3 illustrates relay characteristics appropriate to the system shown in FIG. 2, FIG. 4 illustrates in schematic form a relay circuit embodying the invention, FIG. 5 illustrates relay characteristics of the relay shown in FIG. 4, FIG. 6 illustrates a circuit modification of the schematic form of the relay circuit shown in FIG. 4, and FIG. 7 illustrates a further modification of this relay circuit.

When the electro-conductive armature of an induction-type relay has currents induced in it and a polarizing flux is provided, a force acts on the armature which tends to move it. When the armature is moved a certain distance from a neutral position the relay is caused to perform a protective action. If an operating flux is produced in accordance with the current of a protected line and a restraiinng flux is produced in accordandce with the voltage in a protected line, the relay will only operate when the impedance of the line falls below a certain value. This value depends upon the phase angle between the current and the voltage and upon features of the relay such as the biasing action of control springs, etc.

Figure 1:
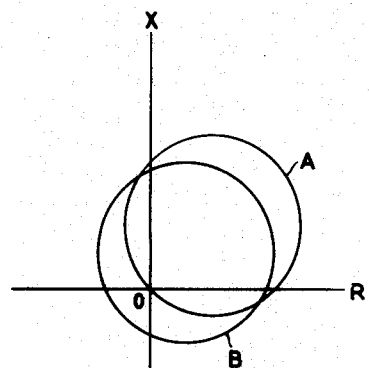
FIG. 1 illustrates characteristics of a known directional impedance relay.

To render such a relay directional in operation the relay is designed to have the characteristic which may be represented by the circle A in FIG. 1. This circle defines the critical impedance below which the relay will operate. The co-ordinates R and X represent the resistance and reactance respectively of a protected line.

However, it is common practice in directional impedance relays to offset the characteristic as shown by the circle A in FIG. 1 so that it no longer passes through the origin O. This offset makes the unit non-directional, but in some applications this is not important. Thus the circle A shown in FIG. 1 may be displaced to the position represented by the circle B.

In the past the displacement of this circle A to the position shown by circle B has been achieved by introducing into the voltage circuit of the relay a signal from a reactor or transactor in the current circuit. Thus the restraining winding has been energized in accordance with the current and voltage of the protected line. In some systems both the restraining and the polarizing windings are energized from the combined signal.

A known system of this form is shown in FIG. 2. In FIG. 2 an electro-conductive armature 10 is shown to be influenced by four poles 11a, 11b, 11c and 11d arranged in quadrature. The relay has four terminals, two current terminals 12a and 12b and two voltage terminals 13a and 13b. An operating winding 14 which is arranged to carry a current proportional to that in a protected line is connected in series with an impedance 15 and the combination is connected across the terminals 12a and 12b, the impedance end of the combination being connected to the terminal 12b. The operating winding 14 embraces the pole 11a and when energized produces a flux which induces a current in the electro-conductive armature 10. The poles 11b and 11d, which are opposite one another carry a polarizing winding 16 which is connected at one end to the junction of the operating winding 14 and the impedance 15 and at the other end through a capacitor 17 to the terminal 13b. The terminal 13a is connected directly to the terminal 12b. Thus when a voltage signal is applied to the voltage terminals 13a and 13b and a current is passed through the operating winding 14, the voltage across the polarizing winding 16 and the capacitor 17 will be equal to the applied voltage less the potential drop across the impedance 15. The current which flows through the polarizing winding establishes a flux in the poles 11b and 11d which reacts with the current through the armature 10 to produce a torque on the armature. The value of the capacitor 17 is such that it forms with the polarizing winding 16 a resonant circuit at the supply frequency which causes a transient flux to be maintained in the event of the voltage signal applied to the terminals 13a and 13b falling to zero. A restraining winding 18 is arranged on the pole 11c, which is opposite pole 11a, and this restraining winding 18 is arranged to be energized in accordance with the voltage and current applied to the voltage terminals 13a and 13b and the current terminals 12a and 12b respectively. One end of the restraining winding 18 is connected directly to the terminal 13b and the other end of the winding is connected to the junction between the impedance 15 and the operating winding 14.

With the system shown in FIG. 2 the effect of biasing the polarizing and restraining windings modifies the operating characteristic of the relay from the form illustrated by the circle A in FIG. 1 to the form illustrated by the circle B. Thus, the reach of the relay has been reduced. This means that for the relay characteristic to have the same "reach," by which is meant the maximum impedance below which the relay will operate, the ohmic setting of the relay must be modified. Such modification involves utilizing tapped transformers in the potential circuit which controls the energization of the restraining coil and involves the provision of a separate tapped transformer for each zone circuit in a system of back-up protection in which, say, the first zone is not biased and the second and third zones are biased to different degrees.

Thus, whereas FIG. 1 illustrates the offset of the relay characteristics produced by the biasing system of FIG. 2, FIG. 3 illustrates the modification of the relay characteristic obtained by an adjustment of tappings on a transformer supplying the relay. In FIG. 3 a circle C corresponding to the circle B of FIG. 1 is shown and concentric with the circle C there is a circle D which has the same reach as the circle A of FIG. 1. A disadvantage of the system shown in FIG. 2 is that to obtain the required offset without changing the reach of the relay a progressive adjustment of the offsetting impedance 15 and the tappings of a transformer is required. It often happens that an initial adjustment of the offset is disturbed by a subsequent adjustment of the reach and the whole process of adjustment has to be started all over again before the required conditions are obtained.

It is desirable to be able to shift the circle in such a way that the reach of the relay is not changed. Thus, in FIG. 5 two relay characteristics are shown; the circle E represents the normal characteristic and the circle F represents the characteristic which is desirable.

It has been found possible to obtain such a characteristic by using a system of the form shown in FIG. 4.

In FIG. 4 a system somewhat similar to that shown in FIG. 2 is presented. There is the difference, however, that the restraining winding 18 is connected directly across the voltage terminals 13a and 13b. With only the polarizing winding influenced by the current in the protected circuit this system produces the characteristic represented by the circle F in FIG. 5.

Also shown in FIG. 4 are the connections between the terminals 12a, 12b, 13a and 13b and current and voltage transformers energized by a circuit protected by the relay. The protected circuit is shown schematically as a single phase two-wire circuit 50 which energizes a current transformer 51 and a voltage transformer 52. The secondary windings of these transformers are connected respectively to the terminals 12a, 12b and 13a, 13b to provide the necessary current and voltage excitation signals of the relay.

In a system which utilizes a series of relays having a co-operative function (e.g. some may afford back-up protection to others), the fact that the restraining winding is energized directly from the voltage terminals and that the characteristic of the relay can be adjusted without adjusting this voltage enables the voltage terminals of all the relays to be energized from a common source. Thus, if there are three units in the system a single tapped transformer can be used for the restraining coils of all three units. The characteristic of the relay can be adjusted by adjusting the impedance 15 and since in the system shown in FIG. 4 this can be done without changing the "reach" of the relay there is no need to have provision for an adjustment of the tappings on a voltage transformer.

It is to be understood that the relay circuit shown in FIG. 4 may be modified to have the same functional character. In principle, it is simply necessary to introduce into the polarizing circuit a voltage signal proportional to the operating current. One way of doing this is to use the potential drop across the operating winding. This is possible if the relay is supplied through a tapped current transformer which enables the requisite ratio between the operating signal and the current component of the polarizing signal to be obtained. There are, however, other ways. For example, whereas in the circuit shown in FIG. 4 there is a direct electrical connection between the operating winding 14 and the polarizing winding 16, this connection may take the form of an inductive coupling as shown in FIG. 6. The circuit shown in FIG. 6 is identical to that shown in FIG. 4 apart from the replacement of the impedance 15 by a loaded transformer 30. The primary winding 30a of this transformer is connected directly in the circuit of the operating winding 14 and the secondary winding 30b is connected directly in the circuit of the polarizing winding 16. An adjustable resistive load 31 is connected across the secondary winding 30b. This ensures that the voltage component introduced into the polarizing circuit is proportional to the current through the operating winding and affords connections by which the relay characteristic may be adjusted.

In practice it is preferable to dispense with the transformer 30 and utilize the pole 11a as a magnetic core which provides the magnetic coupling between the operating winding and the polarizing winding. Thus in FIG. 7 a further modification of the circuit shown in FIGS. 4 and 6 is presented and the flux produced by the current in the winding 14 is caused to induce in an additional winding 40 a signal which is introduced into the polarizing circuit. In effect, the winding 40 constitutes the secondary winding 30b of the transformer 30 shown in FIG. 6 and the winding 14 itself constitutes the primary winding 30a. In this case a resistive load is provided by the variable resistor 41.

The operation of the circuits shown in FIGS. 6 and 7 is analogous to that in the circuit shown in FIG. 4.

What I claim as my invention and desire to secure by Letters Patent is:

1. An electrical protective relay system comprising a protected circuit, a current transformer having a primary winding connected to be energized by said circuit, a voltage transformer having a primary winding connected to be energized by said circuit, and a relay comprising an electro-conductive armature, a magnetic core system adapted to apply a torque to said armature when windings on said core system are energized, an operating winding and a restraining winding and a polarizing winding mounted on said core system and operative to apply by electro-magnetic induction a torque to the armature proportional to the product of the energization of the polarizing winding and the differential energization of the operating winding and the restraining winding, means for producing a voltage proportional to the current in the operating winding, a pair of current terminals connected to the secondary winding of the current transformer and a pair of voltage terminals connected to the secondary winding of the voltage transformer, the operating winding being connected at least indirectly across said current terminals, the restraining winding being connected directly across said voltage terminals, and the polarizing winding being connected to said voltage terminals via the said voltage producing means so that (a) said operating winding is energized in proportion to a current supplied to the current terminals, (b) said restraining winding is energized in proportion to a voltage supplied to the voltage terminals only and (c) said polarizing winding is energized in proportion to a vectorial summation of the voltage supplied to the voltage terminals and the voltage produced by said voltage producing means.

2. An electrical protective relay system according to claim 1, wherein the magnetic core system comprises four equiangularly spaced poles and said operating winding is mounted on one pole, said restraining winding is mounted on the pole opposite to said one pole, and the polarizing winding is in two sections, one on each of the remaining poles, the operating winding being connected across said current terminals through said voltage producing means, the restraining winding being connected directly to said voltage terminals, the polarizing winding being connected between one voltage terminal and the junction between the operating winding and said voltage producing means, and there being a common connection between the other voltage terminal and the connection of said voltage producing means to a current terminal.

3. An electrical protective relay system according to claim 2, wherein said voltage producing means comprise a variable impedance element connected in the circuit of the polarizing winding for adjusting the relay characteristic.

4. An electrical protective relay system comprising a protected circuit, a current transformer having a primary winding connected to be energized by said circuit, a voltage transformer having a primary winding connected to be energized by said circuit, and a relay comprising an electro-conductive armature, a magnetic core system adapted to apply a torque to said armature when windings on said core system are energized, an operating winding and a restraining winding and a polarizing winding mounted on said core system and operative to apply by electro-magnetic induction a torque to the armature proportional to the product of the energization of the polarizing winding and the differential energization of the operating winding and the restraining widig, a magetic coupling device, a pair of current terminals connected to the secondary winding of the current transformer and a pair of voltage terminals connected to the secondary winding of the voltage transformer, the operating winding being connected across said current terminals, the restraining winding being connected directly across said voltage terminals, and the polarizing winding being connected to said voltage terminals via the said magnetic coupling device so that (a) said operating winding is energized in proportion to the current supplied to the current terminals, (b) said restraining winding is energized in proportion to a voltage supplied by the voltage terminals only, and (c) said polarizing winding is energized in proportion to a vectorial summation of the voltage supplied to the voltage terminals and the output voltage from said magnetic coupling device.

5. An electrical protective relay system according to claim 4, wherein the magnetic core system comprises four equiangularly spaced poles and said operating winding is mounted on one pole, said restraining winding is mounted on the pole opposite to said one pole, and the polarizing winding is in two sections, one on each of the remaining poles, the operating winding being connected across said current terminals through the primary winding of said magnetic coupling device, the restraining winding being connected directly to said voltage terminals and the secondary winding of said magetic coupling device being connected with the two sections of the polarizing winding in series between the voltage terminals.

6. An electrical protective relay system according to claim 5, which further comprises a variable impedance element connected in the circuit of the polarizing winding for adjusting the relay characteristic.

7. An electrical protective relay system comprising a protected circuit, a current transformer having a primary winding connected to be energized by said circuit, a voltage transformer having a primary winding connected to be energized by said circuit, and a relay comprising an electro-conductive armature, a magnetic core system adapted to apply a torque to said armature when windings on said core are energized, an operating winding and a restraining winding and a polarizing winding mounted on said core system and operative to apply by electro-magnetic induction a torque to the armature proportional to the product of the energization of the polarizing winding and the differential energization of the operating winding and the restraining winding, an auxiliary winding mounted on said core system and inductively coupled by the core system with the operating winding, a pair of current terminals connected to the secondary winding of the current transformer and a pair of voltage terminals connected to the secondary winding of the voltage transformer, the operating winding being connected across said current terminals, the restraining winding being connected directly across said voltage terminals, and the polarizing winding being connected via said auxiliary winding to said voltage terminals so that (a) said opearting winding is energized in proportion to the current supplied to the current terminals, (b) said restraining winding is energized in proportion to a voltage supplied by the voltage terminals only, and (c) said polarizing winding is energized in proportion to a vectorial summation of the voltage supplied to the voltage terminals and the voltage produced by said auxiliary winding.

8. An electrical protective relay system according to claim 7, wherein the magnetic core system comprises four equiangularly spaced poles and said operating winding is mounted on one pole, said restraining winding is mounted on the pole opposite to said one pole, the polarizing winding is in two sections which are mounted one on each of the remaining poles, and the auxiliary winding is mounted on the same pole as the operating winding, the operating winding being connected directly to said current terminals, the restraining winding being connected directly to said voltage terminals, and the auxiliary winding being connected with the two sections of the polarizing winding in series between the voltage terminals.

9. An electrical protective relay system according to claim 8, which further comprises a variable impedance element connected in the circuit of the polarizing winding for adjusting the relay characteristic.

References Cited in the file of this patent
UNITED STATES PATENTS

| | | |
|---|---|---|
| 2,011,387 | Warrington | Aug. 13, 1935 |
| 2,426,013 | Goldsborough | Aug. 19, 1947 |
| 2,426,062 | Sonnemann | Aug. 19, 1947 |
| 2,792,531 | Glassburn | May 14, 1957 |